United States Patent
Cox et al.

(10) Patent No.: US 6,880,979 B2
(45) Date of Patent: Apr. 19, 2005

(54) CONNECTOR ASSEMBLY

(75) Inventors: Larry R. Cox, Austin, TX (US); Mark D. Matthies, Austin, TX (US); Curtis L. Shoemaker, Round Rock, TX (US); James G. Vana, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/364,232

(22) Filed: Feb. 11, 2003

(65) Prior Publication Data

US 2004/0156592 A1 Aug. 12, 2004

(51) Int. Cl.[7] .............................................. G02B 6/36
(52) U.S. Cl. ........................................................ 385/76
(58) Field of Search .............................. 385/76–78, 60, 385/62, 69–72, 84, 86–89, 92, 139; 439/358, 352, 357, 344, 354

(56) References Cited

U.S. PATENT DOCUMENTS

| | | | |
|---|---|---|---|
| 5,259,052 A | | 11/1993 | Briggs et al. |
| 5,333,221 A | | 7/1994 | Briggs et al. |
| 6,019,521 A | * | 2/2000 | Manning et al. ............... 385/77 |
| 6,079,881 A | * | 6/2000 | Roth ............................ 385/76 |
| 6,206,581 B1 | * | 3/2001 | Driscoll et al. ............... 385/78 |
| 6,367,987 B1 | | 4/2002 | Beier et al. |
| 6,572,275 B1 | * | 6/2003 | Shimoji et al. ............... 385/76 |

OTHER PUBLICATIONS

Search Report for PCT/US2004/003298.

* cited by examiner

Primary Examiner—Javaid H. Nasri
(74) Attorney, Agent, or Firm—Melanie G. Gover

(57) ABSTRACT

The present invention relates to a connectible termination having a terminated fiber optic connector and a means for actuating the connector from a coupling. The terminated fiber optic connector comprises a ferrule housing having first and second portions and at least one optical fibers mounted in a ferrule and disposed in the first portion of the ferrule housing, a body comprising a front and back portions, the second portion of the ferrule housing disposed on the front portion of the body, and a latch disposed on the back portion of the body and comprising a pair of ears. One means for disengaging the connector is a collar disposed on the latch and enclosing the pair of ears.

15 Claims, 7 Drawing Sheets

US 6,880,979 B2

CONNECTOR ASSEMBLY

BACKGROUND

The present invention relates to an apparatus for use with a connector. In particular the present invention relates to an apparatus that permits a user to actuate a connector, such as a fiber optic connector, located in a difficult to access area.

The use of optical fibers for high-volume, high-speed communication is well established. For example, the design of traditional electronic cabinets has been altered to accommodate optical and opto-electronic devices. In traditional cabinet designs, the cabinet is generally a box having a back side of a front panel and plurality of daughter cards, which are generally parallel to each other. Each daughter card typically has a face plate that may contain a coupling having at least one port. In one application, terminated fiber optic connectors are installed into the couplings. Interconnection of optical fibers, i.e., the data transport medium, occurs when the terminated fiber optic connectors are mated together in the coupling or, more generally, when optical devices containing terminated optical fibers are mated in the couplings.

Today, as the real estate in cabinets and daughter cards become increasingly valuable, in some applications, the connectors are forced to be located in difficult to access areas, i.e., areas with very limited space for an individual to access.

Thus, there is a need in the art for a connector designed for use in difficult to access areas.

SUMMARY

The present invention relates to an apparatus for delatching or disconnecting a connector that has been installed in a coupling, all of which are located in a difficult to access area on a daughter card. As used herein, an area is "difficult to access" when it is located in a confined space (usually less than a few millimeters and in some instances, less than one millimeter access space) where there are surrounding components that prevents one from unlatching the installed connector. The apparatus can be used in conjunction with an electronic connector or a fiber optic connector.

In one aspect, the present invention relates to a connectible termination comprising (a) a terminated fiber optic connector comprising a ferrule housing having first and second portions and at least one optical fiber mounted in a ferrule that is disposed in said first portion of said ferrule housing, a body comprising a front and back portions, said second portion of said ferrule housing disposed on said front portion of said body, and a latch disposed on said back portion of said body; and (b) means for disengaging said terminated fiber optic connector from a port coupling.

In another aspect, the present invention to a connectible termination comprising (a) a terminated fiber optic connector comprising a ferrule housing having first and second portions and at least one optical fibers mounted in a ferrule and disposed in said first portion of said ferrule housing, a body comprising a front and back portions, said second portion of said ferrule housing disposed on said front portion of said body, and a latch disposed on said back portion of said body; and (b) a collar disposed on said latch.

The above summary of the present invention is not intended to describe each disclosed embodiment or every implementation of the present invention. The figures and detailed description that follow below more particularly exemplify illustrative embodiments.

BRIEF DESCRIPTION OF THE DRAWINGS

The invention can be further described with the figures below, wherein.

These figures are idealized, not drawn to scale and are intended only for illustrative purposes.

DETAILED DESCRIPTION OF THE INVENTION

As described in detail below, an advantage of at least one embodiment of the present invention is that it allow for the unlatching of an installed connector from a coupling from only one access point on the connectible termination. Thus, if the assembly is located in a difficult to access area, one can still unlatch and remove the installed connector by applying various forces to only one point of the connectible termination. In this detailed description, the term "about" modifies all numeric values.

Figure 1:
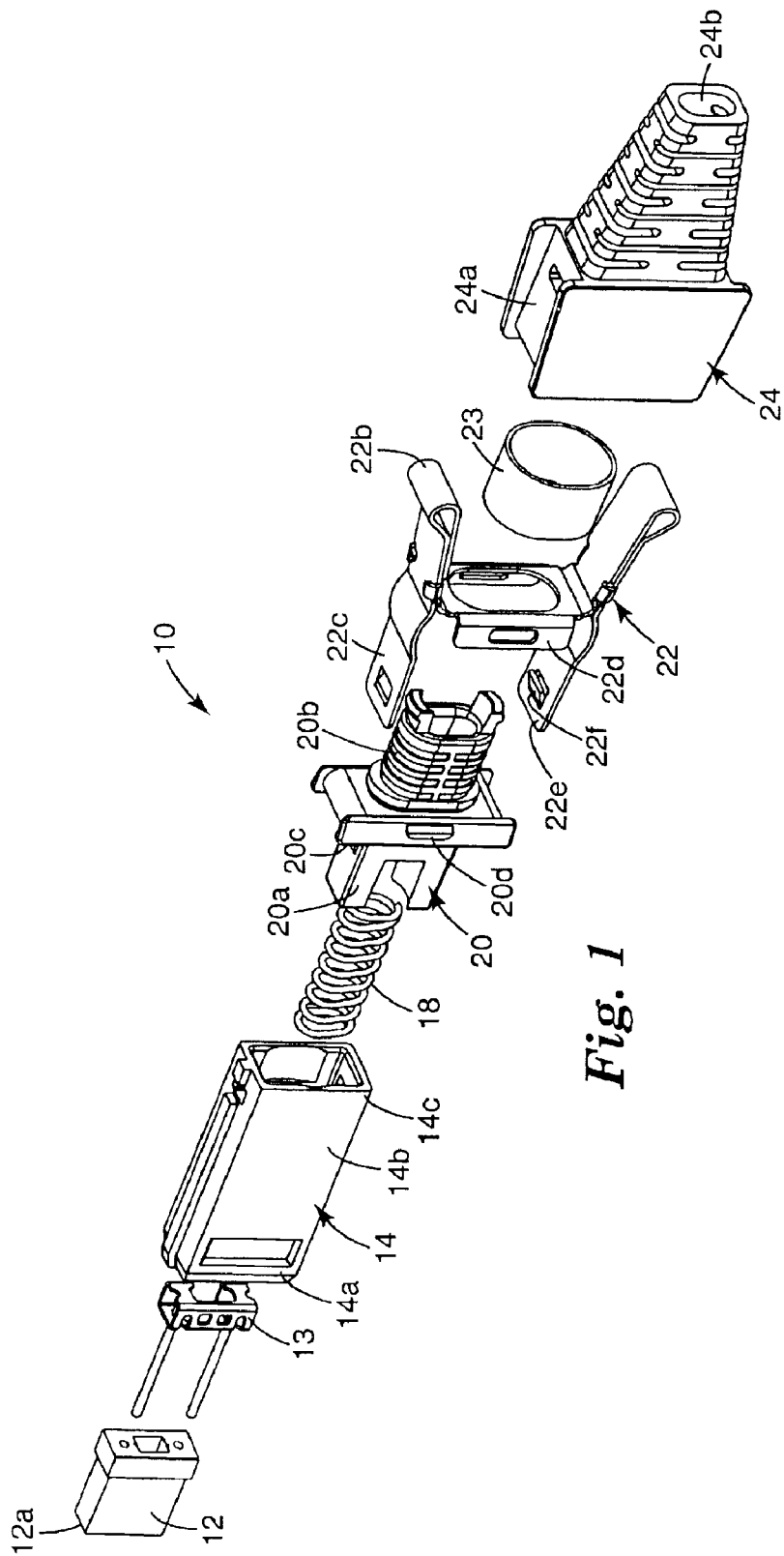
FIG. 1 is an exploded isometric view of an exemplary terminated fiber optic connector that may be used in conjunction with the present invention.

FIG. 1 is an exploded view of a first exemplary terminated fiber optic connector that may be used with the present invention. Terminated fiber optic connector 10 includes ferrule housing 14 having a first portion 14a and second portion 14b, ferrule 12, ferrule guide 13, spring 18, body 20 having front portion 20a, back portion 20b, and ledge 20c, latch 22 having a pair of ears 22b, first and second arms 22c and 22e respectively, clasp 22d and catch 22f, ring 23, and optionally boot 24. When assembled, the ferrule and ferrule guide are disposed generally in the first portion of the ferrule housing. The spring abuts the ferrule guide and the spring is disposed generally in second portion 14b of the ferrule housing as well as in front portion 20a of the body. End 14c of the ferrule housing is disposed on ledge 20c of the body. The latch is assembled to the body such that clasp 22d of the latch mates with tab 20d of the body. Boot 24 slides onto back portion 20b of the body such that ears 22b of the latch reside in grooves 24a of the boot. Although not shown, a fiber optic ribbon or individual optical fibers would be threaded through opening 24b of the boot, ring 23, second portion 20b of the body, the spring and finally mounted in the ferrule with its end face flushed with ferrule mating end 12a. In one exemplary embodiment the ferrule guide, spring, body, and latch are made from metallic materials. And, ferrule, ferrule housing and boot are made from polymeric materials. A commercially available terminated fiber optic connector generally meeting the description of FIG. 1 can be obtained from the 3M Company of St. Paul, Minn. under the product name OGI Backplane Connector.

Figure 2:
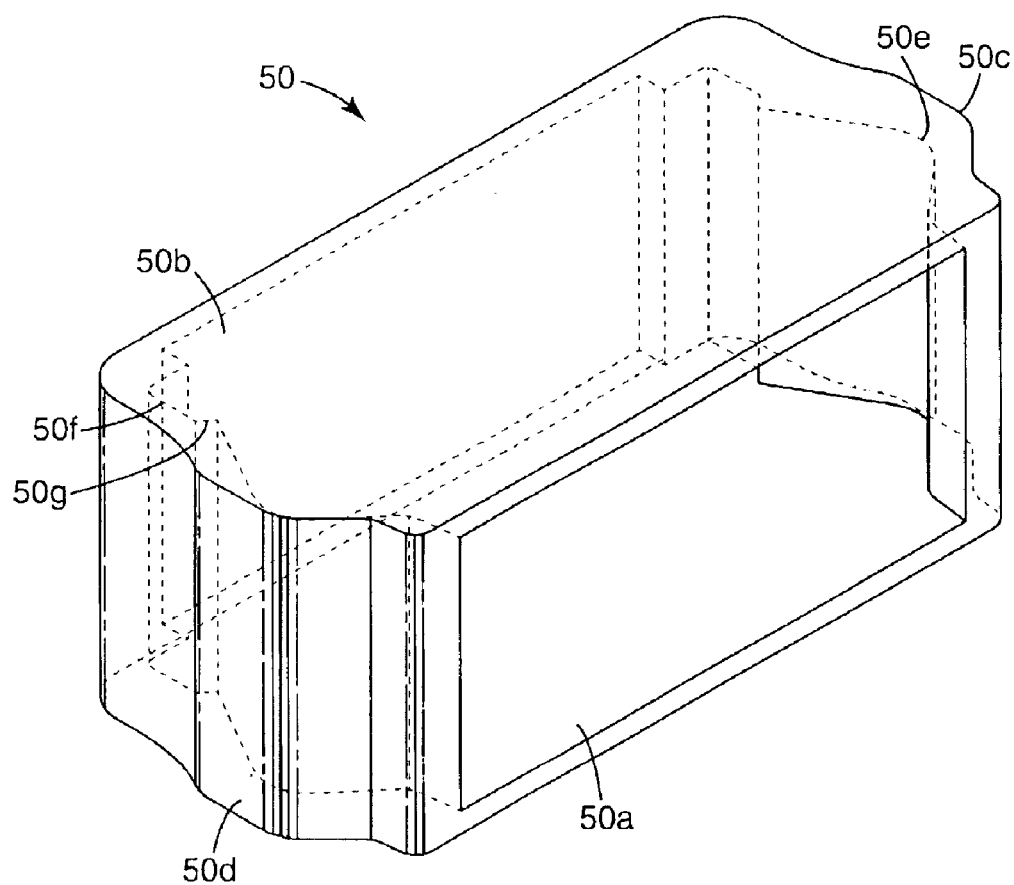
FIG. 2 is an isometric view of an exemplary means for actuating the terminated fiber optic connector of FIG. 1.
Figure 3:
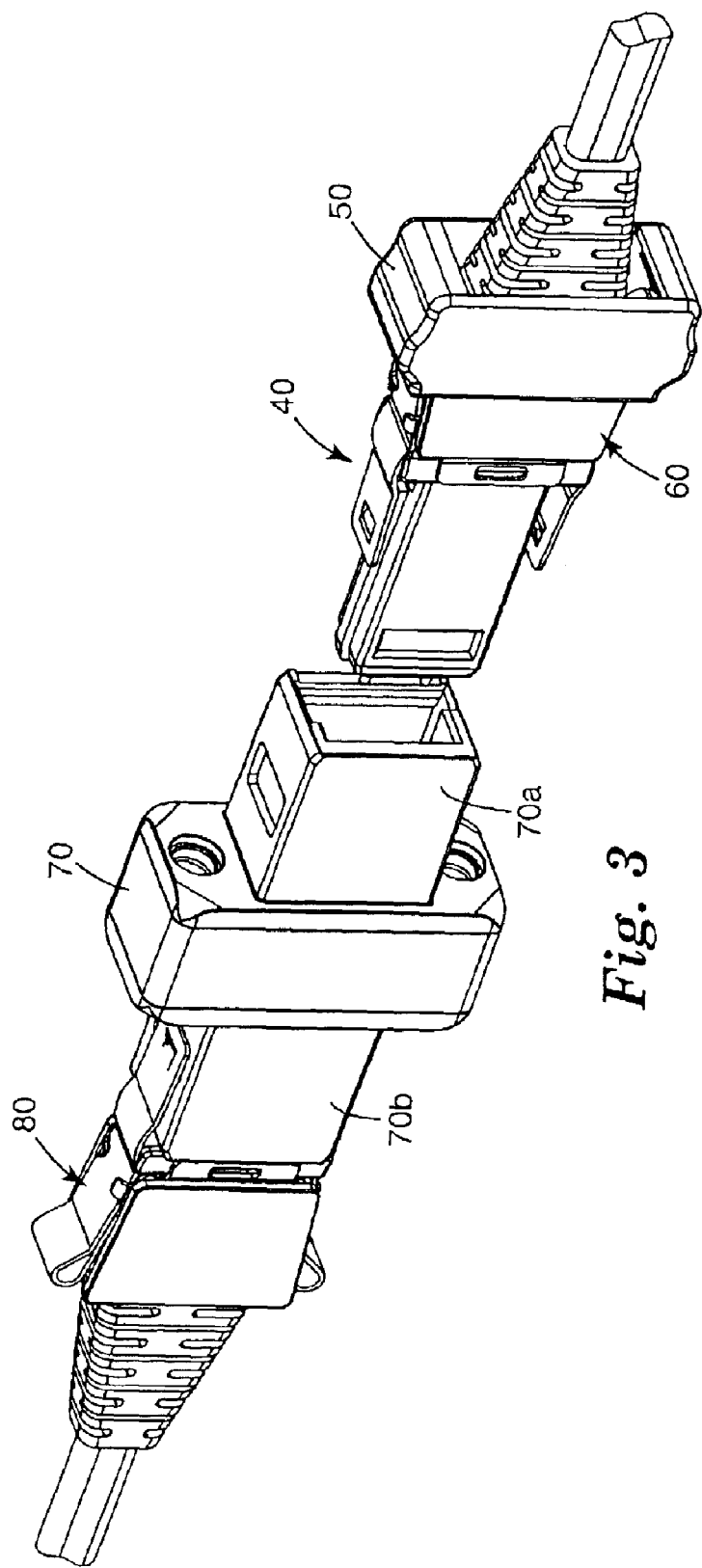
FIG. 3 is an isometric view of connectible termination 60, not yet engaged into a coupling, the termination comprising the terminated fiber optic connector of FIG. 1 and the means for disengaging of FIG. 2 in accordance with one aspect of the present invention.

FIG. 2 shows an isometric view of an exemplary means for actuating the terminated fiber optic connector in a mechanical device, such as a coupling, like that of reference number 70 in FIG. 3. One exemplary means for actuating the terminated connector in a mechanical device is through the use of apparatus 50, which can be described generally as a collar. Apparatus 50 is irregular shaped having front opening 50a rear opening 50b and curved first and second sides 50c and 50d respectively. In one exemplary embodiment, although both front and rear openings 50a, 50b are substantially rectangular, the front opening is slightly larger in dimensions than the rear opening. In one exemplary embodiment, front opening 50a is 7.5 mm wide and 16.2 mm long while back opening 50b is 7.5 mm wide and 15.3 mm long. The device has a longest length dimension that is appropriate to accommodate the distance between ears 22b (FIG. 1). The device has a width that is appropriate to accommodate the thickness of the latch. In an exemplary embodiment, the collar has a longest dimension of greater than 0.75 inch (19 mm) and a width of greater than 0.25 inch (6 mm), and a depth of greater than 0.25 inch (6 mm). In another exemplary embodiment, the collar has a longest dimension of 0.9 inch (24 mm), a width of 0.4 inch (10 mm) and a depth of 0.35 inch (9 mm). As used herein, the terms of relative location, such as front and back, top and bottom, forward and rear are used only for descriptive purposes.

The collar can be constructed out of any material, such as metals, polymers, ceramics, wood, and composites thereof. In an exemplary embodiment, the device is polymeric. A wide variety of polymers can be used for the collar. The selected polymer should maintain structural integrity when exposed to 85° C. for at least 3 days and up to 7 days, and when exposed to −40° C. for at least 3 days and up to 7 days. Suitable polymeric materials include, but are not limited to, polyester, polycarbonate, polyvinyl chloride (PVC), acrylonitrile, butadiene, styrene (ABS), and nylon. In one exemplary embodiment, the collar is constructed from VALOX 420 SEO, believed to be a polyester material, commercially available from GE Plastics. Other injection moldable polymers are also useful.

Figure 8:
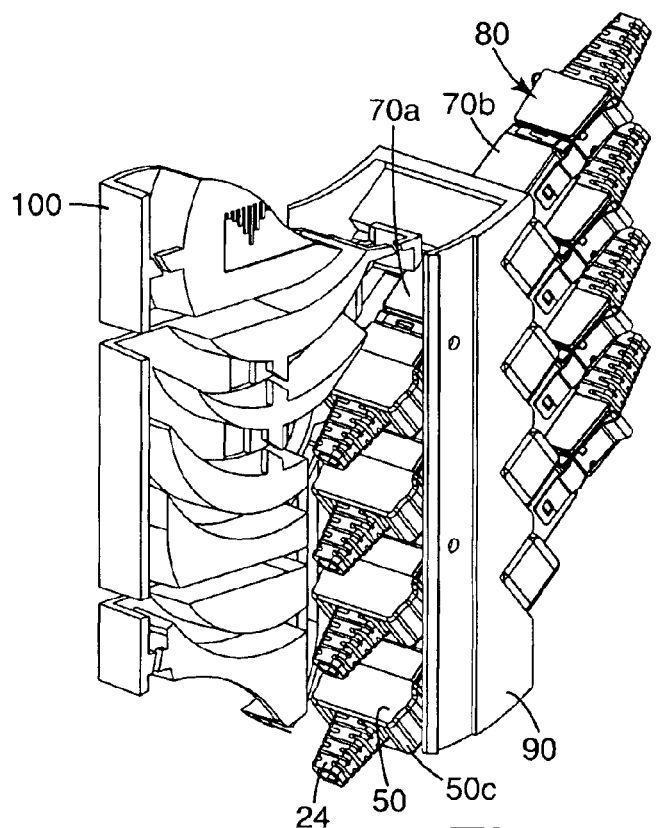
FIG. 8 is an isometric view of an exemplary coupling and associated connectible termination that are a part of a daughter card, the coupling being located in a difficult to access area.

FIG. 3 shows an isometric view of terminated fiber optic connector 40 used with the means for actuating connector 50 to yield a connectible termination 60. The termination has not been mated to coupling 70, which has front and rear ports 70a and 70b respectively. Although FIG. 3 shows a front and rear port coupling, one skilled in the art will understand that a coupling may have multiple front and rear ports. FIG. 3 further shows that second terminated optical fiber connector 80, which does not contain a means for delatching a connector, has been mated to port 70b. In one application, as best seen in FIG. 8, coupling 70 is mounted on a daughter card in a cabinet such that connectible termination 60 is part of the front panel and located inside the cabinet, while connector 80 is outside of the cabinet readily accessible to a user.

Figure 4:
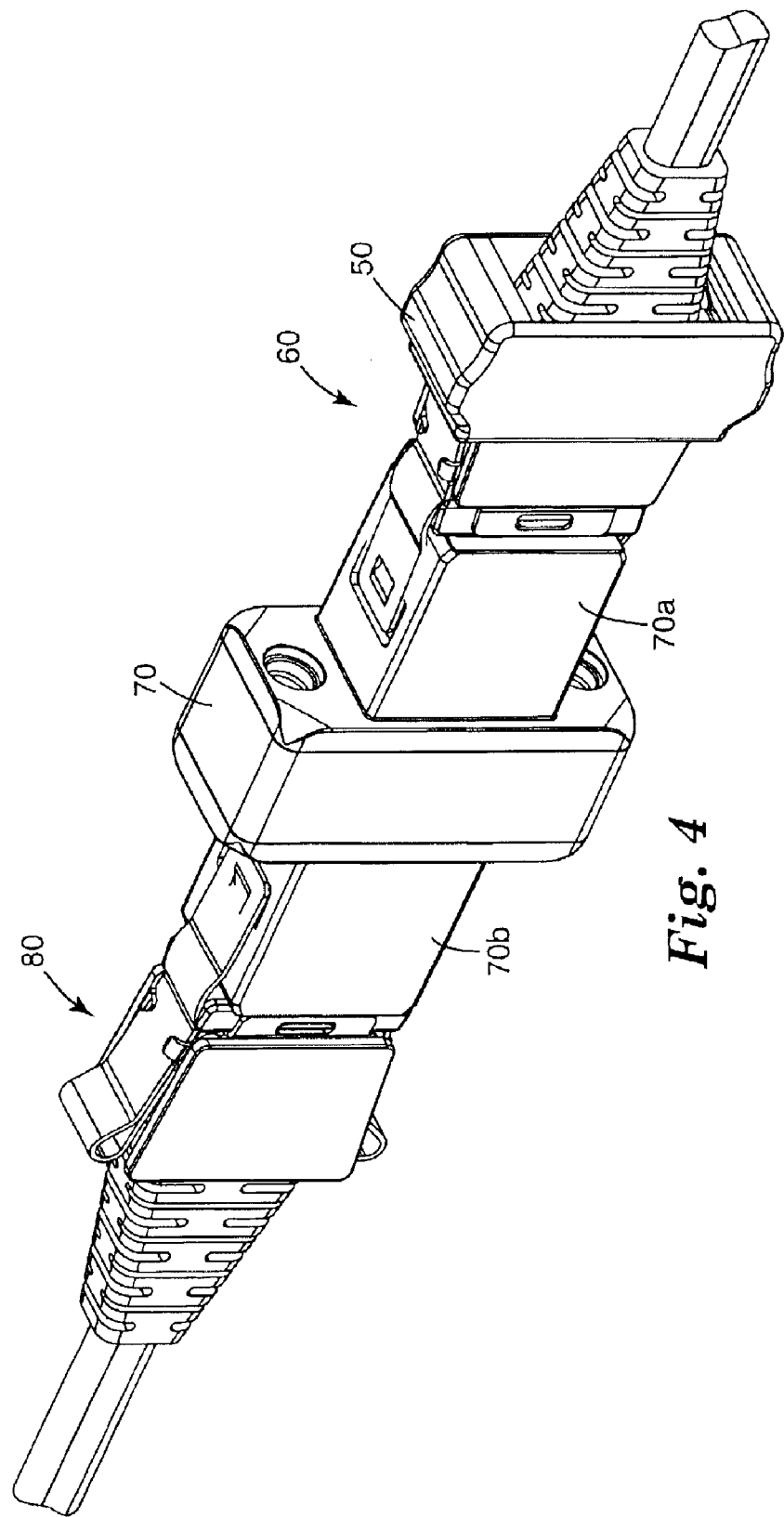
FIG. 4 is an isometric view of the embodiment in FIG. 3 where the connectible termination 60 and fiber optic connector 80 have been engaged into the coupling.

FIG. 4 shows the embodiment of FIG. 3 where the connectible termination 60 and connector 80 are both engaged in the coupling 70 so that the terminated optical fibers residing therein are in optical communication with each other. Collar 50 functions to unlatch the connectible termination 60 from port 70a. In another application, coupling 70 contains connectible termination 60 in both its front and rear ports.

Figure 5:
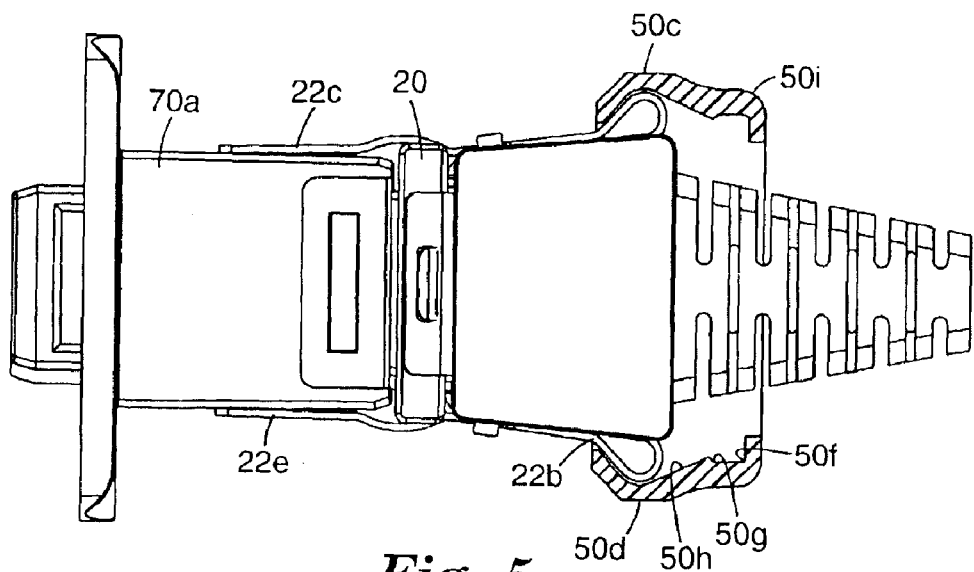
FIGS. 5, 6, and 7 are various side views of the connectible termination.
Figure 6:
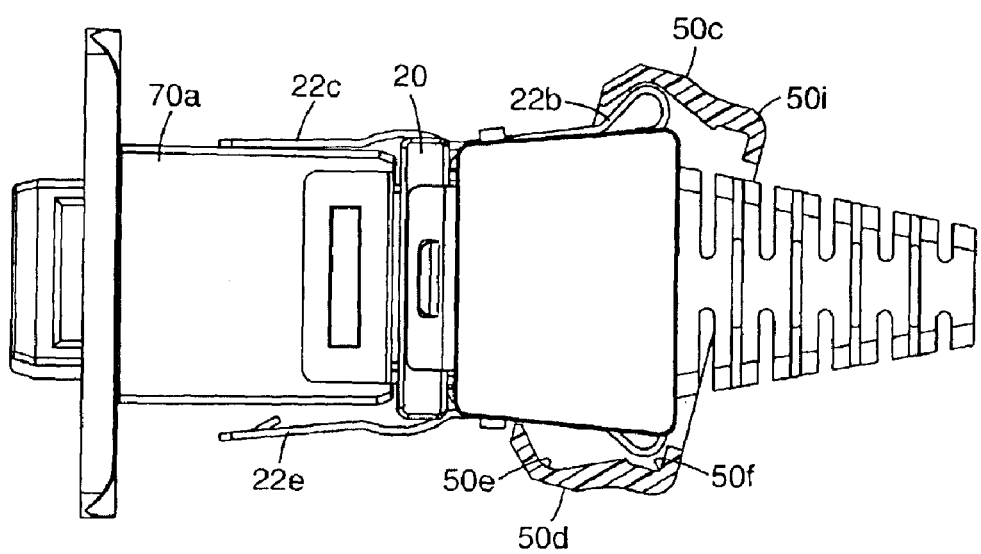
Figure 7:
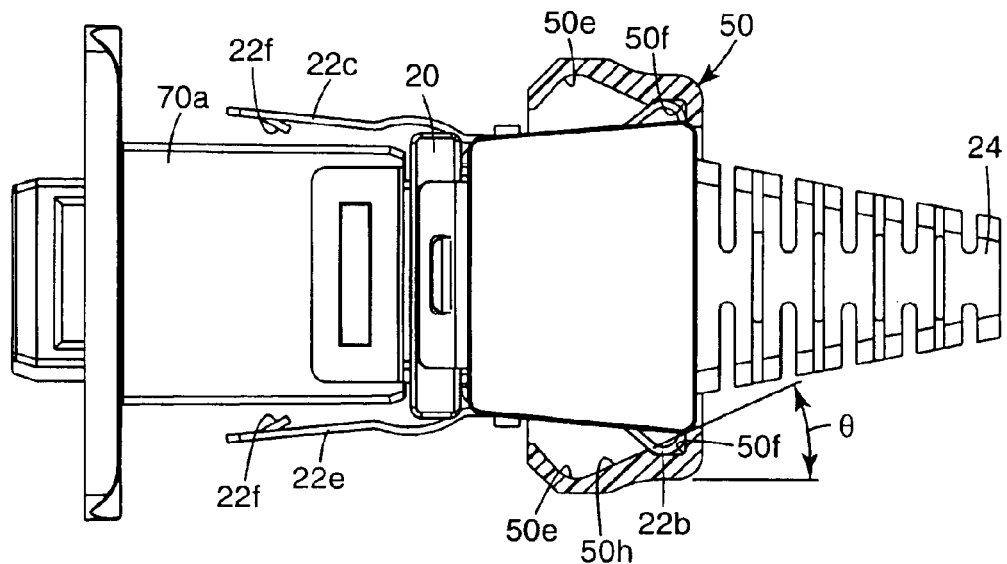

FIGS. 5, 6 and 7 show the connector in latched, partial unlatched, and fully unlatched positions respectively. Once the connector is unlatched, a user can remove connectible termination 60 from the coupling. The design and use of the collar can be better explained in these figures which show the terminated connectible termination mated to front port 70a of the coupling. In addition to the description associated with FIG. 2, collar 50 further contains unlatch detent 50f and latched detent 50e. In this exemplary embodiment, the unlatch detent can be generally described as containing a right angle with shoulder 50g (also shown in FIG. 2) so as to hold ears 22b in place. Latched detent 50e is substantially curved and generally matches the outer curvature of ears 22b. In one exemplary embodiment, the radius of curvature of the latched detent is 0.045 inch (1.1 mm). Incline 50h acts primarily as a transition zone from latch detent 50f to unlatch detent 50e. In one exemplary embodiment, the incline, as measured from an imaginary horizontal line (shown as angle θ in FIG. 7) is less than 30°. When the connector is in the latched position (as shown in FIG. 5), latch detent 50c lies in contact with latch ears 22b and catch 22f (not shown in FIG. 5) on latch arms 22c and 22e are held in grooves (not shown) located on the coupling. In the latched position, the collar can be described as being in a passive mode. Another advantage of at least one embodiment of the present invention is that the collar maintains its position while in the passive mode or in the actuated mode thus preventing any slippage.

FIG. 6 shows the partial actuation of the collar so as to disengage or unlatch the connectible termination 60 from the coupling. A user would first apply a force to the most accessible corner of the collar, typically the front corner region designated generally as 50i. Although the force is in a general downward direction, one skilled in the art will understand that such a direction depends on how the connectible termination is installed in the coupling. With application of this first force, second side 50d rotates such that the ear associated with that side moves from latched detent 50e to unlatch detent 50f. Catch 22f on latch arm 22e has been disengaged from the groove located on the side of port 70a of the coupling. Because of the shoulder on the unlatch detent, the ear is held in place. As can be seen, after an application of the first force collar 50 lies in an angled position. The user applies a second force on region 50i towards port 70a thereby fully actuating the collar. The second force is applied in a direction that is generally perpendicular to the first force and towards the port. After application of this second force, both ears are now in contact with the unlatch detent. The connectible termination can now be removed from the coupling. As best shown in FIG. 7, in the full unlatch position, both catch 22f on latch arms 22c and 22e are totally disengaged from the grooves in port 70a of the coupling.

FIG. 8 shows one exemplary embodiment of a coupling containing four ports, similar to FIG. 4, having been mounted vertically to face plate 90, which is part of a daughter card. Fiber routing trays 100 can be used to route the optical fibers or ribbons (not shown). As one skilled in the art will appreciate, front port 70a of the coupling is mounted in a difficult to access area and a user typically will only be able to access first side 50c of the collar to actuate the connectible termination in the port. In one application, the distance or clearance between the face plate and first side 50c is less than a few millimeters, on the order of one millimeter. Because the connectible termination is mounted vertically in this particular embodiment, the user would apply a first force towards rack 90 and a second force generally perpendicular to the first force to actuate the collar.

Figure 9A:
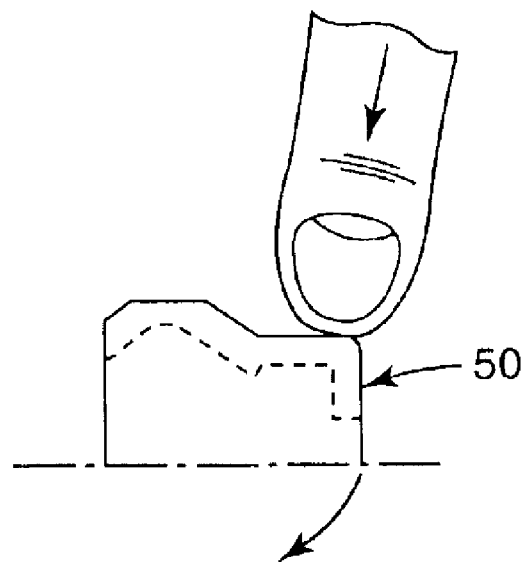
FIGS. 9a and 9b are schematic views illustrating an exemplary method of actuating the connectible termination.
Figure 9B:
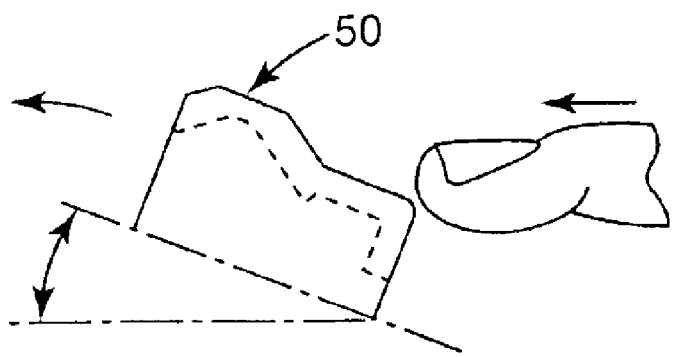

FIGS. 9a and 9b illustrate one exemplary method of actuating collar 50 so as to disengage the installed connector assembly from the coupling. In these two figures, for ease of understanding, only one half of the collar is shown. FIG. 9a shows application of a first force, generally in an accessible corner of the collar. With application of this force, collar 50 is no longer perpendicular with its original center line (shown generally as a dashed line). As shown in FIG. 9b, after application of the first force, the collar has a new center line that is at an angle relative to its original centerline. A second force is then applied to the collar generally in a direction substantially perpendicular to the direction of the first force. While these figures show actuating of the collar by use of an individual's finger, one skilled in the art will appreciate that other mechanical devices can be used, although it is not necessary to resort to mechanical devices.

What is claimed is:

1. A connectible termination comprising:
    (a) a terminated fiber optic connector comprising
        (i) a ferrule housing having first and second portions and at least one optical fibers mounted in a ferrule and disposed in said first portion of said ferrule housing, (ii) a body comprising a front and back portions, said second portion of said ferrule housing disposed on said front portion of said body, and (iii) a latch disposed on said body for engaging a coupling; and
    (b) a collar disposed on said latch for disengaging said latch from said coupling wherein said collar includes a latched detent, an unlatched detent, and an incline between said latched detent and unlatched detent.

2. The connectible termination of claim 1, wherein said collar has front and rear rectangular openings, said front rectangular opening being larger in dimension than rear rectangular opening.

3. The connectible termination of claim 1, engaged in a coupling having at least one port.

4. The connectible termination of claim 3, wherein said coupling has two ports, said connectible termination engaged in one port, a terminated fiber optic connector in the other port such that the optical fibers of the assembly and the connector are in optical communication.

5. The connectible termination of claim 3, wherein said coupling is mounted on the faceplate portion of a daughter card.

6. The connectible termination of claim 5 disposed in a difficult to access area.

7. The connectible termination of claim 1, wherein said latch comprises a pair of ears and said collar is disposed on said latch so as to enclose said pair of ears.

8. The connectible termination of claim 1, wherein said collar is selected from the group consisting of metals, polymers, ceramics, wood, and combinations thereof.

9. The connectible termination of claim 1, wherein said collar has a longest length dimension of 24 mm a width of 10 mm, and a depth of 9 mm.

10. The connectible termination of claim 1, wherein said latched detent has a radius of curvature of about 1.1 mm.

11. The connectible termination of claim 1, wherein said incline is less than 30°.

12. The connectible termination of claim 1, wherein said unlatched detent contains a shoulder.

13. The connectible termination of claim 8, wherein said polymer is selected from the group consisting of polyester, polycarbonate, polyvinyl chloride, ABS, and nylon.

14. A method for actuating the connectible termination of claim 7 from a coupling, said method comprising the steps of
    (a) applying a first force to an accessible corner of the collar and
    (b) applying a second force to said corner, said second force perpendicular to the first force and towards said coupling.

15. The method of claim 14 further comprising the step of removing said connector from the coupling after step (b).

* * * * *